United States Patent
Leijon et al.

(10) Patent No.: US 6,894,416 B1
(45) Date of Patent: *May 17, 2005

(54) HYDRO-GENERATOR PLANT (75) Inventors: Mats Leijon, Västerås (SE); Bo Hernnäs, Västerås (SE); Peter Carstensen, Huddinge (SE); Mons Hölleland, Västerås (SE); Peter Templin, Köping (SE); Lars Gertmar, Västerås (SE); Claes Ivarson, Västerås (SE); Erland Sörensen, Västerås (SE); Gunnar Davidsson, Västerås (SE); Gunnar Kylander, Västerås (SE); Bertil Larsson, Västerås (SE); Sören Berggren, Västerås (SE); Bertil Berggren, Västerås (SE); Jan-Anders Nygren, Västerås (SE); Bengt Rydholm, Västerås (SE); Hans-Olof Kalldin, Västerås (SE)

(73) Assignee: ABB AB, Vasteras (SE)

( * ) Notice: Subject to any disclaimer, the term of this patent is extended or adjusted under 35 U.S.C. 154(b) by 881 days.

This patent is subject to a terminal disclaimer.

(21) Appl. No.: 08/973,018

(22) PCT Filed: May 27, 1997

(86) PCT No.: PCT/SE97/00885

§ 371 (c)(1),
(2), (4) Date: Mar. 25, 1998

(87) PCT Pub. No.: WO97/45923

PCT Pub. Date: Dec. 4, 1997

(30) Foreign Application Priority Data

May 29, 1996 (SE) ................................. 9602079

(51) Int. Cl.⁷ .............................. H02K 3/40; H02K 3/12

(52) U.S. Cl. ...................... 310/196; 310/179; 310/180; 310/195; 174/DIG. 19; 174/DIG. 28; 290/1 R (58) Field of Search ................................. 310/179–180, 310/184, 195–196, 198–208, 213, 156, 181, 215, 254; 174/DIG. 13–DIG. 33; 290/7

(56) References Cited

U.S. PATENT DOCUMENTS 681,800 A    9/1901  Lasche (Continued)

FOREIGN PATENT DOCUMENTS

AT            399790      7/1995

(Continued)

OTHER PUBLICATIONS

A test installation of a self–tuned ac filter in the Konti–Skan 2 HVDC link; T. Holmgren, G. Asplund, S. Valdemarsson, P. Hidman of ABB; U. Jonsson of Svenska Kraftnat; O. loof of Vattenfall Vastsverige AB; IEEE Stockholm Power Tech Conference Jun. 1995, pp 64–70.

(Continued)

Primary Examiner—Burton Mullins
(74) Attorney, Agent, or Firm—Dykema Gossett PLLC (57) ABSTRACT The magnetic circuit of a generator in a hydro-generator plant is arranged to directly supply a high supply voltage of 20–800 kV, preferably higher than 36 kV. The generator is provided with solid insulation and its winding includes a cable (6) comprising one or more current-carrying conductors (31) with a number of strands (36) surrounded by at least one outer and one inner semiconducting layer (34, 32) and intermediate insulating layers (33). The outer semiconducting layer (34) is at earth potential. The stator winding may be produced with full or fractional slot winding, the phases of the winding being Y-connected. The Y-point may be insulated and protected from over-voltage by means of surge arresters, or else the Y-point may be earthed via a suppression filter. The invention also relates to a hydro-generator plant, a generator included in the plant and a procedure for building such a plant.

35 Claims, 5 Drawing Sheets

U.S. PATENT DOCUMENTS

| | | | |
|---|---|---|---|
| 847,008 A | 3/1907 | Kitsee | |
| 1,304,451 A | 5/1919 | Burnham | |
| 1,418,856 A | 6/1922 | Williamson | |
| 1,481,585 A | 1/1924 | Beard | |
| 1,508,456 A | 9/1924 | Lenz | |
| 1,728,915 A | 9/1929 | Blankenship et al. | |
| 1,742,985 A | 1/1930 | Burnham | |
| 1,747,507 A | 2/1930 | George | |
| 1,756,672 A | 4/1930 | Barr | |
| 1,762,775 A | 6/1930 | Ganz | |
| 1,781,308 A | 11/1930 | Vos | |
| 1,861,182 A | 5/1932 | Hendey et al. | |
| 1,904,885 A | 4/1933 | Seeley | |
| 1,974,406 A | 9/1934 | Apple et al. | |
| 2,006,170 A | 6/1935 | Juhlin | |
| 2,206,856 A | 7/1940 | Shearer | |
| 2,217,430 A | 10/1940 | Baudry | |
| 2,241,832 A | 5/1941 | Wahlquist | |
| 2,251,291 A | 8/1941 | Reichelt | |
| 2,256,897 A | 9/1941 | Davidson et al. | |
| 2,295,415 A | 9/1942 | Monroe | |
| 2,409,893 A | 10/1946 | Pendleton et al. | |
| 2,415,652 A | 2/1947 | Norton | |
| 2,424,443 A | 7/1947 | Evans | |
| 2,436,306 A | 2/1948 | Johnson | |
| 2,446,999 A | 8/1948 | Camilli | |
| 2,459,322 A | 1/1949 | Johnston | |
| 2,462,651 A | 2/1949 | Lord | |
| 2,498,238 A | 2/1950 | Berberich et al. | |
| 2,650,350 A | 8/1953 | Heath | |
| 2,721,905 A | 10/1955 | Monroe | |
| 2,749,456 A | 6/1956 | Luenberger | |
| 2,780,771 A | 2/1957 | Lee | |
| 2,846,599 A | 8/1958 | McAdam | |
| 2,885,581 A | 5/1959 | Pileggi | |
| 2,943,242 A | 6/1960 | Schaschl et al. | |
| 2,947,957 A | 8/1960 | Spindler | |
| 2,959,699 A | 11/1960 | Smith et al. | |
| 2,962,679 A | 11/1960 | Stratton | |
| 2,975,309 A | 3/1961 | Seidner | |
| 3,014,139 A | 12/1961 | Shildneck | |
| 3,098,893 A | 7/1963 | Pringle et al. | |
| 3,130,335 A | 4/1964 | Rejda | |
| 3,143,269 A | 8/1964 | Van Eldik | |
| 3,157,806 A | 11/1964 | Wiedemann | |
| 3,158,770 A | 11/1964 | Coggeshall et al. | 310/214 |
| 3,197,723 A | 7/1965 | Dortort | |
| 3,268,766 A | 8/1966 | Amos | |
| 3,304,599 A | 2/1967 | Nordin | |
| 3,354,331 A | 11/1967 | Broeker et al. | 310/196 |
| 3,365,657 A | 1/1968 | Webb | |
| 3,372,283 A | 3/1968 | Jaecklin | |
| 3,392,779 A | 7/1968 | Tilbrook | |
| 3,411,027 A | 11/1968 | Rosenberg | |
| 3,418,530 A | 12/1968 | Cheever | |
| 3,435,262 A | 3/1969 | Bennett et al. | |
| 3,437,858 A | 4/1969 | White | |
| 3,444,407 A | 5/1969 | Yates | |
| 3,447,002 A | 5/1969 | Ronnevig | |
| 3,484,690 A | 12/1969 | Wald | |
| 3,541,221 A | 11/1970 | Aupoix et al. | |
| 3,560,777 A | 2/1971 | Moeller | |
| 3,571,690 A | 3/1971 | Lataisa | |
| 3,593,123 A | 7/1971 | Williamson | |
| 3,631,519 A | 12/1971 | Salahshourian | |
| 3,644,662 A | 2/1972 | Salahshourian | |
| 3,651,244 A | 3/1972 | Silver et al. | |
| 3,651,402 A | 3/1972 | Leffmann | |
| 3,660,721 A | 5/1972 | Baird | |
| 3,666,876 A | 5/1972 | Forster | |
| 3,670,192 A | 6/1972 | Andersson et al. | |
| 3,675,056 A | 7/1972 | Lenz | |
| 3,684,821 A | 8/1972 | Miyauchi et al. | |
| 3,684,906 A | 8/1972 | Lexz | |
| 3,699,238 A | 10/1972 | Hansen et al. | |
| 3,716,652 A | 2/1973 | Lusk et al. | |
| 3,716,719 A | 2/1973 | Angelery et al. | |
| 3,727,085 A | 4/1973 | Goetz et al. | |
| 3,740,600 A | 6/1973 | Turley | |
| 3,743,867 A | 7/1973 | Smith, Jr. | |
| 3,746,954 A | 7/1973 | Myles et al. | |
| 3,758,699 A | 9/1973 | Lusk et al. | |
| 3,778,891 A | 12/1973 | Amasino et al. | |
| 3,781,739 A | 12/1973 | Meyer | |
| 3,787,607 A | 1/1974 | Schlafly | |
| 3,792,399 A | 2/1974 | McLyman | |
| 3,801,843 A | 4/1974 | Corman et al. | |
| 3,809,933 A | 5/1974 | Sugawara et al. | |
| 3,813,764 A | 6/1974 | Tanaka et al. | |
| 3,828,115 A | 8/1974 | Hvizd, Jr. | |
| 3,881,647 A | 5/1975 | Wolfe | |
| 3,884,154 A | 5/1975 | Marten | |
| 3,891,880 A | 6/1975 | Britsch | 310/196 |
| 3,902,000 A | 8/1975 | Forsyth et al. | |
| 3,912,957 A | 10/1975 | Reynolds | |
| 3,932,779 A | 1/1976 | Madsen | |
| 3,932,791 A | 1/1976 | Oswald | |
| 3,943,392 A | 3/1976 | Keuper et al. | |
| 3,947,278 A | 3/1976 | Youtsey | 106/26 |
| 3,965,408 A | 6/1976 | Higuchi et al. | |
| 3,968,388 A | 7/1976 | Lambrecht et al. | |
| 3,971,543 A | 7/1976 | Shanahan | |
| 3,974,314 A | 8/1976 | Fuchs | 428/212 |
| 3,993,860 A | 11/1976 | Snow et al. | |
| 3,995,785 A | 12/1976 | Arick et al. | |
| 4,001,616 A | 1/1977 | Lonseth et al. | 310/45 |
| 4,008,367 A | 2/1977 | Sunderhauf | |
| 4,008,409 A | 2/1977 | Rhudy et al. | |
| 4,031,310 A | 6/1977 | Jachimowicz | |
| 4,039,740 A | 8/1977 | Iwata | |
| 4,041,431 A | 8/1977 | Enoksen | |
| 4,047,138 A | 9/1977 | Steigerwald | |
| 4,064,419 A | 12/1977 | Peterson | |
| 4,084,307 A | 4/1978 | Schultz et al. | |
| 4,085,347 A | 4/1978 | Lichius | |
| 4,088,953 A | 5/1978 | Sarian | |
| 4,091,138 A | 5/1978 | Takagi et al. | |
| 4,091,139 A | 5/1978 | Quirk | |
| 4,099,227 A | 7/1978 | Liptak | |
| 4,103,075 A | 7/1978 | Adam | |
| 4,106,069 A | 8/1978 | Trautner et al. | |
| 4,107,092 A | 8/1978 | Carnahan et al. | 252/511 |
| 4,109,098 A | 8/1978 | Olsson et al. | |
| 4,121,148 A | 10/1978 | Platzer | |
| 4,132,914 A | 1/1979 | Khutoretsky | |
| 4,134,036 A | 1/1979 | Curtiss | |
| 4,134,055 A | 1/1979 | Akamatsu | |
| 4,134,146 A | 1/1979 | Stetson | |
| 4,149,101 A | 4/1979 | Lesokhin et al. | |
| 4,152,615 A | 5/1979 | Calfo et al. | |
| 4,160,193 A | 7/1979 | Richmond | |
| 4,164,672 A | 8/1979 | Flick | |
| 4,164,772 A | 8/1979 | Hingorani | |
| 4,177,397 A | 12/1979 | Lill | |
| 4,177,418 A | 12/1979 | Brueckner et al. | |
| 4,184,186 A | 1/1980 | Barkan | |
| 4,200,817 A | 4/1980 | Bratoljic | |
| 4,200,818 A | 4/1980 | Ruffing et al. | |
| 4,206,434 A | 6/1980 | Hase | |
| 4,207,427 A | 6/1980 | Beretta et al. | |
| 4,207,482 A | 6/1980 | Neumeyer et al. | 310/45 |

| | | | |
|---|---|---|---|
| 4,208,597 A | 6/1980 | Mulach et al. | |
| 4,229,721 A | 10/1980 | Koloczek et al. | |
| 4,238,339 A | 12/1980 | Khutoretsky et al. | |
| 4,239,999 A | 12/1980 | Vinokurov et al. | |
| 4,245,182 A | 1/1981 | Aotsu et al. | |
| 4,246,694 A | 1/1981 | Raschbichler et al. | |
| 4,255,684 A | 3/1981 | Mischler et al. | |
| 4,258,280 A | 3/1981 | Starcevic | |
| 4,262,209 A * | 4/1981 | Berner | 290/7 |
| 4,274,027 A | 6/1981 | Higuchi et al. | |
| 4,281,264 A | 7/1981 | Keim et al. | |
| 4,292,558 A | 9/1981 | Flick et al. | |
| 4,307,311 A | 12/1981 | Grozinger | |
| 4,308,476 A * | 12/1981 | Schuler | 310/45 |
| 4,308,575 A | 12/1981 | Mase | |
| 4,310,966 A | 1/1982 | Brietenbach | |
| 4,314,168 A | 2/1982 | Breitenbach | |
| 4,317,001 A | 2/1982 | Silver et al. | |
| 4,320,645 A | 3/1982 | Stanley | |
| 4,321,426 A | 3/1982 | Schaeffer | |
| 4,321,518 A | 3/1982 | Akamatsu | |
| 4,330,726 A * | 5/1982 | Albright et al. | 310/254 |
| 4,337,922 A | 7/1982 | Streiff et al. | |
| 4,341,989 A | 7/1982 | Sandberg et al. | |
| 4,347,449 A | 8/1982 | Beau | |
| 4,347,454 A | 8/1982 | Gellert et al. | |
| 4,353,612 A | 10/1982 | Meyers | |
| 4,357,542 A | 11/1982 | Kirschbaum | |
| 4,360,748 A | 11/1982 | Raschbichler et al. | |
| 4,361,723 A | 11/1982 | Hvizd, Jr. et al. | |
| 4,365,178 A | 12/1982 | Lexz | |
| 4,367,425 A | 1/1983 | Mendelsohn et al. | |
| 4,367,890 A | 1/1983 | Spirk | |
| 4,368,418 A | 1/1983 | DeMello et al. | |
| 4,369,389 A | 1/1983 | Lambrecht | 310/214 |
| 4,371,745 A | 2/1983 | Sakashita | 310/213 |
| 4,384,944 A | 5/1983 | Silver et al. | |
| 4,387,316 A | 6/1983 | Katsekas | |
| 4,401,920 A | 8/1983 | Taylor et al. | |
| 4,403,163 A | 9/1983 | Armerding et al. | 310/215 |
| 4,404,486 A | 9/1983 | Keim et al. | |
| 4,411,710 A | 10/1983 | Mochizuki et al. | |
| 4,421,284 A | 12/1983 | Pan | |
| 4,425,521 A | 1/1984 | Rosenberry, Jr. et al. | |
| 4,426,771 A | 1/1984 | Wang et al. | |
| 4,429,244 A * | 1/1984 | Nikitin et al. | 310/254 |
| 4,431,960 A | 2/1984 | Zucker | |
| 4,432,029 A | 2/1984 | Lundqvist | |
| 4,437,464 A | 3/1984 | Crow | |
| 4,443,725 A | 4/1984 | Derderian et al. | |
| 4,470,884 A | 9/1984 | Carr | |
| 4,473,765 A | 9/1984 | Butman, Jr. et al. | 252/502 |
| 4,475,075 A | 10/1984 | Munn | |
| 4,477,690 A | 10/1984 | Nikitin et al. | |
| 4,481,438 A | 11/1984 | Keim | |
| 4,484,106 A | 11/1984 | Taylor et al. | |
| 4,488,079 A | 12/1984 | Dailey et al. | |
| 4,490,651 A | 12/1984 | Taylor et al. | |
| 4,503,284 A | 3/1985 | Minnick et al. | |
| 4,508,251 A | 4/1985 | Harada et al. | |
| 4,510,077 A | 4/1985 | Elton | 310/45 |
| 4,517,471 A | 5/1985 | Sachs | |
| 4,520,287 A | 5/1985 | Wang et al. | |
| 4,523,249 A | 6/1985 | Arimoto | |
| 4,538,131 A | 8/1985 | Baier et al. | |
| 4,546,210 A | 10/1985 | Akiba et al. | |
| 4,551,780 A | 11/1985 | Canay | |
| 4,557,038 A | 12/1985 | Wcislo et al. | |
| 4,560,896 A | 12/1985 | Vogt et al. | |
| 4,565,929 A | 1/1986 | Baskin et al. | |
| 4,571,453 A | 2/1986 | Takaoka et al. | |
| 4,588,916 A | 5/1986 | Lis | |
| 4,590,416 A | 5/1986 | Porche et al. | |
| 4,594,630 A | 6/1986 | Rabinowitz et al. | |
| 4,607,183 A | 8/1986 | Rieber et al. | |
| 4,615,109 A | 10/1986 | Wcislo et al. | |
| 4,615,778 A | 10/1986 | Elton | |
| 4,618,795 A | 10/1986 | Cooper et al. | |
| 4,619,040 A | 10/1986 | Wang et al. | |
| 4,622,116 A | 11/1986 | Elton et al. | |
| 4,633,109 A | 12/1986 | Feigel | |
| 4,650,924 A | 3/1987 | Kauffman et al. | |
| 4,652,963 A | 3/1987 | Fahlen | |
| 4,654,551 A * | 3/1987 | Farr | 310/112 |
| 4,656,316 A | 4/1987 | Meltsch | |
| 4,656,379 A * | 4/1987 | McCarty | 310/181 |
| 4,677,328 A | 6/1987 | Kumakura | |
| 4,687,882 A | 8/1987 | Stone et al. | |
| 4,692,731 A | 9/1987 | Osinga | |
| 4,723,083 A | 2/1988 | Elton | |
| 4,723,104 A | 2/1988 | Rohatyn | |
| 4,724,345 A | 2/1988 | Elton et al. | |
| 4,732,412 A | 3/1988 | van der Linden et al. | |
| 4,737,704 A | 4/1988 | Kalinnikov et al. | |
| 4,745,314 A | 5/1988 | Nakano | |
| 4,761,602 A | 8/1988 | Leibovich | |
| 4,766,365 A | 8/1988 | Bolduc et al. | |
| 4,771,168 A | 9/1988 | Gundersen et al. | |
| 4,785,138 A | 11/1988 | Brietenbach et al. | |
| 4,795,933 A | 1/1989 | Sakai | |
| 4,827,172 A | 5/1989 | Kobayashi | |
| 4,845,308 A | 7/1989 | Womack, Jr. et al. | |
| 4,847,747 A | 7/1989 | Abbondanti | |
| 4,853,565 A * | 8/1989 | Elton et al. | 310/45 |
| 4,859,810 A | 8/1989 | Cloetens et al. | |
| 4,859,989 A | 8/1989 | McPherson | |
| 4,860,430 A | 8/1989 | Raschbichler et al. | |
| 4,864,266 A | 9/1989 | Feather et al. | |
| 4,883,230 A | 11/1989 | Lindstrom | |
| 4,890,040 A | 12/1989 | Gundersen | |
| 4,894,284 A | 1/1990 | Yamanouchi et al. | |
| 4,914,386 A | 4/1990 | Zocholl | |
| 4,918,347 A | 4/1990 | Takaba | |
| 4,918,835 A | 4/1990 | Wcislo et al. | |
| 4,924,342 A | 5/1990 | Lee | |
| 4,926,079 A | 5/1990 | Niemela et al. | |
| 4,942,326 A | 7/1990 | Butler, III et al. | |
| 4,949,001 A * | 8/1990 | Campbell | 310/220 |
| 4,982,147 A | 1/1991 | Lauw | |
| 4,994,952 A | 2/1991 | Silva et al. | |
| 4,997,995 A | 3/1991 | Simmons et al. | |
| 5,012,125 A | 4/1991 | Conway | |
| 5,030,813 A | 7/1991 | Stanisz | |
| 5,036,165 A | 7/1991 | Elton et al. | 310/213 |
| 5,036,238 A | 7/1991 | Tajima | |
| 5,066,881 A | 11/1991 | Elton et al. | 310/213 |
| 5,067,046 A | 11/1991 | Elton et al. | 361/220 |
| 5,083,360 A | 1/1992 | Valencic et al. | |
| 5,086,246 A | 2/1992 | Dymond et al. | |
| 5,091,609 A | 2/1992 | Swada et al. | |
| 5,094,703 A | 3/1992 | Takaoka et al. | |
| 5,095,175 A | 3/1992 | Yoshida et al. | |
| 5,097,241 A | 3/1992 | Smith et al. | |
| 5,097,591 A | 3/1992 | Wcislo et al. | |
| 5,111,095 A | 5/1992 | Hendershot | |
| 5,124,607 A | 6/1992 | Rieber et al. | |
| 5,136,459 A | 8/1992 | Fararooy | |
| 5,140,290 A | 8/1992 | Dersch | |
| 5,153,460 A | 10/1992 | Bovino et al. | |
| 5,168,662 A | 12/1992 | Nakamura et al. | |
| 5,171,941 A | 12/1992 | Shimizu et al. | |
| 5,182,537 A | 1/1993 | Thuis | |

| | | | | | | |
|---|---|---|---|---|---|---|
| 5,187,428 | A | 2/1993 | Hutchison et al. | DE | 482506 | 9/1929 |
| 5,231,249 | A | 7/1993 | Kimura et al. | DE | 501181 | 7/1930 |
| 5,235,488 | A | 8/1993 | Koch | DE | 523047 | 4/1931 |
| 5,246,783 | A | 9/1993 | Spenadel et al. | DE | 568508 | 1/1933 |
| 5,264,778 | A | 11/1993 | Kimmel et al. | DE | 572030 | 3/1933 |
| 5,287,262 | A | 2/1994 | Klein | DE | 584639 | 9/1933 |
| 5,304,883 | A | 4/1994 | Denk | DE | 586121 | 10/1933 |
| 5,305,961 | A | 4/1994 | Errard et al. | DE | 604972 | 11/1934 |
| 5,321,308 | A | 6/1994 | Johncock | DE | 629301 | 4/1936 |
| 5,323,330 | A | 6/1994 | Asplund et al. | DE | 673545 | 3/1939 |
| 5,325,008 | A | 6/1994 | Grant | DE | 719009 | 3/1942 |
| 5,325,259 | A | 6/1994 | Paulsson | DE | 846583 | 8/1952 |
| 5,327,637 | A | 7/1994 | Britenbach et al. | DE | 875227 | 4/1953 |
| 5,341,281 | A | 8/1994 | Skibinski | DE | 975999 | 1/1963 |
| 5,343,139 | A | 8/1994 | Gyugyi et al. | DE | 1465719 | 5/1969 |
| 5,355,046 | A | 10/1994 | Weigelt | DE | 1807391 | 5/1970 |
| 5,365,132 | A | 11/1994 | Hann et al. | DE | 2050674 | 5/1971 |
| 5,387,890 | A | 2/1995 | Estop et al. | DE | 1638176 | 6/1971 |
| 5,397,513 | A | 3/1995 | Steketee, Jr. | DE | 2155371 | 5/1973 |
| 5,399,941 | A | 3/1995 | Grothaus et al. | DE | 2400698 | 7/1975 |
| 5,400,005 | A | 3/1995 | Bobry | DE | 2520511 | 11/1976 |
| 5,408,169 | A | 4/1995 | Jeanneret | DE | 2656389 | 6/1978 |
| 5,449,861 | A | 9/1995 | Fujino et al. | DE | 2721905 | 11/1978 |
| 5,452,170 | A | 9/1995 | Ohde et al. | DE | 137164 | 8/1979 |
| 5,468,916 | A | 11/1995 | Litenas et al. | DE | 138840 | 11/1979 |
| 5,499,178 | A | 3/1996 | Mohan | DE | 2824951 | 12/1979 |
| 5,500,632 | A | 3/1996 | Halser, III | DE | 2835386 | 2/1980 |
| 5,510,942 | A | 4/1996 | Bock et al. | DE | 2839517 | 3/1980 |
| 5,530,307 | A | 6/1996 | Horst | DE | 2854520 | 6/1980 |
| 5,533,658 | A | 7/1996 | Benedict et al. | DE | 3009102 | 9/1980 |
| 5,534,754 | A | 7/1996 | Poumey | DE | 2913697 | 10/1980 |
| 5,545,853 | A | 8/1996 | Hildreth | DE | 2920478 | 12/1980 |
| 5,550,410 | A * | 8/1996 | Titus ............................ 290/52 | DE | 3028777 | 3/1981 |
| 5,583,387 | A | 12/1996 | Takeuchi et al. | DE | 2939004 | 4/1981 |
| 5,587,126 | A | 12/1996 | Steketee, Jr. | DE | 3006382 | 8/1981 |
| 5,598,137 | A | 1/1997 | Alber et al. | DE | 3008818 | 9/1981 |
| 5,607,320 | A | 3/1997 | Wright | DE | 209313 | 4/1984 |
| 5,612,510 | A | 3/1997 | Hildreth | DE | 3305225 | 8/1984 |
| 5,663,605 | A * | 9/1997 | Evans et al. ................. 310/181 | DE | 3309051 | 9/1984 |
| 5,672,926 | A * | 9/1997 | Brandes et al. ............. 310/181 | DE | 3441311 | 5/1986 |
| 5,689,223 | A | 11/1997 | Demarmels et al. | DE | 3543106 | 6/1987 |
| 5,807,447 | A | 9/1998 | Forrest | DE | 2917717 | 8/1987 |
| 5,834,699 | A | 11/1998 | Buck et al. | DE | 3612112 | 10/1987 |

FOREIGN PATENT DOCUMENTS

| | | | | | |
|---|---|---|---|---|---|
| | | | DE | 3726346 | 2/1989 |
| | | | DE | 3728346 | 2/1989 |
| BE | 565063 | 2/1957 | DE | PCT/DE 90/00279 | 11/1990 |
| CH | 391071 | 4/1965 | DE | 3925337 | 2/1991 |
| CH | 266037 | 10/1965 | DE | 4023903 | 11/1991 |
| CH | 534448 | 2/1973 | DE | 4022476 | 1/1992 |
| CH | 539328 | 7/1973 | DE | 4233558 | 3/1994 |
| CH | 646403 | 2/1979 | DE | 4402184 | 8/1995 |
| CH | 657482 | 8/1986 | DE | 4409794 | 8/1995 |
| CH | 1189322 | 10/1986 | DE | 4412761 | 10/1995 |
| CN | PCT/CN 96/00010 | 10/1996 | DE | 4420322 | 12/1995 |
| DE | 40414 | 8/1887 | DE | 19620906 | 1/1996 |
| DE | 277012 | 7/1914 | DE | 4438186 | 5/1996 |
| DE | 336418 | 6/1920 | DE | 19020222 | 3/1997 |
| DE | 372390 | 3/1923 | DE | 19547229 | 6/1997 |
| DE | 386561 | 12/1923 | DE | 468827 | 7/1997 |
| DE | 387973 | 1/1924 | DE | 134022 | 12/2001 |
| DE | 406371 | 11/1924 | EP | 049104 | 4/1982 |
| DE | 425551 | 2/1926 | EP | 0493704 | 4/1982 |
| DE | 426793 | 3/1926 | EP | 0056580 A1 | 7/1982 |
| DE | 432169 | 7/1926 | EP | 078908 | 5/1983 |
| DE | 433749 | 9/1926 | EP | 0120154 | 10/1984 |
| DE | 435608 | 10/1926 | EP | 0130124 | 1/1985 |
| DE | 435609 | 10/1926 | EP | 0142813 | 5/1985 |
| DE | 436809 | 10/1926 | EP | 0155405 | 9/1985 |
| DE | 441717 | 3/1927 | EP | 0102513 | 1/1986 |
| DE | 443011 | 4/1927 | EP | 0174783 | 3/1986 |
| DE | 460124 | 5/1928 | EP | 0185788 | 7/1986 |

| | | | | | |
|---|---|---|---|---|---|
| EP | 0277358 | 8/1986 | GB | 702892 | 1/1954 |
| EP | 0234521 | 9/1987 | GB | 715226 | 9/1954 |
| EP | 0244069 | 11/1987 | GB | 723457 | 2/1955 |
| EP | 0246377 | 11/1987 | GB | 739962 | 11/1955 |
| EP | 0265868 | 5/1988 | GB | 763761 | 12/1956 |
| EP | 0274691 | 7/1988 | GB | 805721 | 12/1958 |
| EP | 0280759 | 9/1988 | GB | 827600 | 2/1960 |
| EP | 0282876 | 9/1988 | GB | 854728 | 11/1960 |
| EP | 0309096 | 3/1989 | GB | 870583 | 6/1961 |
| EP | 0314860 | 5/1989 | GB | 913386 | 12/1962 |
| EP | 0316911 | 5/1989 | GB | 965741 | 8/1964 |
| EP | 0317248 | 5/1989 | GB | 992249 | 5/1965 |
| EP | 0335430 | 10/1989 | GB | 1024583 | 3/1966 |
| EP | 0342554 | 11/1989 | GB | 1053337 | 12/1966 |
| EP | 0221404 | 5/1990 | GB | 1059123 | 2/1967 |
| EP | 0375101 | 6/1990 | GB | 1103098 | 2/1968 |
| EP | 0406437 | 1/1991 | GB | 1103099 | 2/1968 |
| EP | 0439410 | 7/1991 | GB | 1117401 | 6/1968 |
| EP | 0440865 | 8/1991 | GB | 1135242 | 12/1968 |
| EP | 0469155 A1 | 2/1992 | GB | 1147049 | 4/1969 |
| EP | 0490705 | 6/1992 | GB | 1157885 | 7/1969 |
| EP | 0503817 | 9/1992 | GB | 1174659 | 12/1969 |
| EP | 0571155 | 11/1993 | GB | 1236082 | 6/1971 |
| EP | 0620570 | 10/1994 | GB | 1268770 | 3/1972 |
| EP | 0620630 | 10/1994 | GB | 1319257 | 6/1973 |
| EP | 0642027 | 3/1995 | GB | 1322433 | 7/1973 |
| EP | 0671632 | 9/1995 | GB | 1340983 | 12/1973 |
| EP | 0676777 | 10/1995 | GB | 1341050 | 12/1973 |
| EP | 0677915 | 10/1995 | GB | 1365191 | 8/1974 |
| EP | 0684679 | 11/1995 | GB | 1395152 | 5/1975 |
| EP | 0684682 | 11/1995 | GB | 1424982 | 2/1976 |
| EP | 0695019 | 1/1996 | GB | 1426594 | 3/1976 |
| EP | 0732787 | 9/1996 | GB | 1438610 | 6/1976 |
| EP | 0738034 | 10/1996 | GB | 1445284 | 8/1976 |
| EP | 0739087 A2 | 10/1996 | GB | 1479904 | 7/1977 |
| EP | 0740315 | 10/1996 | GB | 1493163 | 11/1977 |
| EP | 0749190 A2 | 12/1996 | GB | 1502938 | 3/1978 |
| EP | 0751605 | 1/1997 | GB | 1525745 | 9/1978 |
| EP | 0739087 A3 | 3/1997 | GB | 2000625 | 1/1979 |
| EP | 0749193 A3 | 3/1997 | GB | 1548633 | 7/1979 |
| EP | 0780926 | 6/1997 | GB | 2046142 | 11/1979 |
| EP | 0802542 | 10/1997 | GB | 2022327 | 12/1979 |
| EP | 0913912 A1 | 5/1999 | GB | 2025150 | 1/1980 |
| FR | 805544 | 4/1936 | GB | 2034101 | 5/1980 |
| FR | 841351 | 1/1938 | GB | 1574796 | 9/1980 |
| FR | 847899 | 12/1938 | GB | 2070341 | 9/1981 |
| FR | 916959 | 12/1946 | GB | 2070470 | 9/1981 |
| FR | 1011924 | 4/1949 | GB | 2071433 | 9/1981 |
| FR | 1126975 | 3/1955 | GB | 2081523 | 2/1982 |
| FR | 1238795 | 7/1959 | GB | 2099635 | 12/1982 |
| FR | 2108171 | 5/1972 | GB | 2105925 | 3/1983 |
| FR | 2251938 | 6/1975 | GB | 2106306 | 4/1983 |
| FR | 2305879 | 10/1976 | GB | 2106721 | 4/1983 |
| FR | 2376542 | 7/1978 | GB | 2136214 | 9/1984 |
| FR | 2467502 | 4/1981 | GB | 2140195 | 11/1984 |
| FR | 2481531 | 10/1981 | GB | 2150153 | 6/1985 |
| FR | 2556146 | 6/1985 | GB | 2268337 | 1/1994 |
| FR | 2594271 | 8/1987 | GB | 2273819 | 6/1994 |
| FR | 2708157 | 1/1995 | GB | 2283133 | 4/1995 |
| FR | PCT/FR 98/00468 | 6/1998 | GB | 2289992 | 12/1995 |
| GB | 123906 | 3/1919 | GB | 2308490 | 6/1997 |
| GB | 268271 | 3/1927 | GB | 2332557 | 6/1999 |
| GB | 293861 | 11/1928 | HU | 175494 | 11/1981 |
| GB | 292999 | 4/1929 | JP | 60206121 | 3/1959 |
| GB | 319313 | 7/1929 | JP | 57043529 | 8/1980 |
| GB | 518993 | 3/1940 | JP | 57126117 | 5/1982 |
| GB | 537609 | 6/1941 | JP | 59076156 | 10/1982 |
| GB | 540456 | 10/1941 | JP | 59159642 | 2/1983 |
| GB | 589071 | 6/1947 | JP | 6264964 | 9/1985 |
| GB | 666883 | 2/1952 | JP | 1129737 | 5/1989 |
| GB | 685416 | 1/1953 | JP | 62320631 | 6/1989 |

| | | | | | |
|---|---|---|---|---|---|
| JP | 2017474 | 1/1990 | WO | WO9745922 | 12/1997 |
| JP | 3245748 | 2/1990 | WO | WO9745923 | 12/1997 |
| JP | 4179107 | 11/1990 | WO | WO9745924 | 12/1997 |
| JP | 318253 | 1/1991 | WO | WO9745925 | 12/1997 |
| JP | 424909 | 1/1992 | WO | WO9745926 | 12/1997 |
| JP | 5290947 | 4/1992 | WO | WO9745927 | 12/1997 |
| JP | 6196343 | 12/1992 | WO | WO9745928 | 12/1997 |
| JP | 6233442 | 2/1993 | WO | WO9745929 | 12/1997 |
| JP | 6325629 | 5/1993 | WO | WO9745930 | 12/1997 |
| JP | 7057951 | 8/1993 | WO | WO9745931 | 12/1997 |
| JP | 7264789 | 3/1994 | WO | WO9745932 | 12/1997 |
| JP | 8167332 | 12/1994 | WO | WO9745933 | 12/1997 |
| JP | 7161270 | 6/1995 | WO | WO9745934 | 12/1997 |
| JP | 8264039 | 11/1995 | WO | WO9745935 | 12/1997 |
| JP | 9200989 | 1/1996 | WO | WO9745936 | 12/1997 |
| JP | 8036952 | 2/1996 | WO | WO9745937 | 12/1997 |
| JP | 8167360 | 6/1996 | WO | WO9745938 | 12/1997 |
| LU | 67199 | 3/1972 | WO | WO9745939 | 12/1997 |
| SE | 90308 | 9/1937 | WO | WO9747067 | 12/1997 |
| SE | 305899 | 11/1968 | WO | WO9820595 | 5/1998 |
| SE | 255156 | 2/1969 | WO | WO9820596 | 5/1998 |
| SE | 341428 | 12/1971 | WO | WO9820597 | 5/1998 |
| SE | 453236 | 1/1982 | WO | WO 98/20598 | 5/1998 |
| SE | 457792 | 6/1987 | WO | WO9820600 | 5/1998 |
| SE | PCT SE 91/00077 | 4/1991 | WO | WO 98/20602 | 5/1998 |
| SE | 502417 | 12/1993 | WO | WO9821385 | 5/1998 |
| SE | PCT/SE 98/02148 | 6/1999 | WO | WO9827634 | 6/1998 |
| SU | 792302 | 1/1971 | WO | WO9827635 | 6/1998 |
| SU | 425268 | 9/1974 | WO | WO9827636 | 6/1998 |
| SU | 1019553 | 1/1980 | WO | WO9829927 | 7/1998 |
| SU | 694939 | 1/1982 | WO | WO9829928 | 7/1998 |
| SU | 955369 | 8/1983 | WO | WO9829929 | 7/1998 |
| SU | 1511810 | 5/1987 | WO | WO9829930 | 7/1998 |
| WO | WO8202617 | 8/1982 | WO | WO9829931 | 7/1998 |
| WO | WO8502302 | 5/1985 | WO | WO9829932 | 7/1998 |
| WO | WO9011389 | 10/1990 | WO | WO9833731 | 8/1998 |
| WO | WO9012409 | 10/1990 | WO | WO9833736 | 8/1998 |
| WO | WO9101059 | 1/1991 | WO | WO9833737 | 8/1998 |
| WO | WO9101585 | 2/1991 | WO | WO9834238 | 8/1998 |
| WO | WO9107807 | 3/1991 | WO | WO 98/34239 | 8/1998 |
| WO | WO9109442 | 6/1991 | WO | WO9834240 | 8/1998 |
| WO | WO 91/11841 | 8/1991 | WO | WO9834241 | 8/1998 |
| WO | WO8115862 | 10/1991 | WO | WO9834242 | 8/1998 |
| WO | WO 91/15755 | 10/1991 | WO | WO9834243 | 8/1998 |
| WO | WO9201328 | 1/1992 | WO | WO9834244 | 8/1998 |
| WO | WO9203870 | 3/1992 | WO | WO9834245 | 8/1998 |
| WO | WO9321681 | 10/1993 | WO | WO9834246 | 8/1998 |
| WO | WO9406194 | 3/1994 | WO | WO9834247 | 8/1998 |
| WO | WO9518058 | 7/1995 | WO | WO9834248 | 8/1998 |
| WO | WO9522153 | 8/1995 | WO | WO9834249 | 8/1998 |
| WO | WO9524049 | 9/1995 | WO | WO9834250 | 8/1998 |
| WO | WO9622606 | 7/1996 | WO | WO9834309 | 8/1998 |
| WO | WO9622607 | 7/1996 | WO | WO9834312 | 8/1998 |
| WO | WO9630144 | 10/1996 | WO | WO9834315 | 8/1998 |
| WO | WO9710640 | 3/1997 | WO | WO9834321 | 8/1998 |
| WO | WO9711831 | 4/1997 | WO | WO9834322 | 8/1998 |
| WO | WO9716881 | 5/1997 | WO | WO9834323 | 8/1998 |
| WO | WO 97/29494 | 8/1997 | WO | WO9834325 | 8/1998 |
| WO | WO9745288 | 12/1997 | WO | WO9834326 | 8/1998 |
| WO | WO9745847 | 12/1997 | WO | WO9834327 | 8/1998 |
| WO | WO9745848 | 12/1997 | WO | WO9834328 | 8/1998 |
| WO | WO9745906 | 12/1997 | WO | WO9834329 | 8/1998 |
| WO | WO9745907 | 12/1997 | WO | WO9834330 | 8/1998 |
| WO | WO9745912 | 12/1997 | WO | WO9834331 | 8/1998 |
| WO | WO9745914 | 12/1997 | WO | WO 98/40627 | 9/1998 |
| WO | WO9745915 | 12/1997 | WO | WO 98/43336 | 10/1998 |
| WO | WO9745916 | 12/1997 | WO | WO9917309 | 4/1999 |
| WO | WO9745918 | 12/1997 | WO | WO9917311 | 4/1999 |
| WO | WO9745919 | 12/1997 | WO | WO9917312 | 4/1999 |
| WO | WO9745920 | 12/1997 | WO | WO9917313 | 4/1999 |
| WO | WO9745921 | 12/1997 | WO | WO9917314 | 4/1999 |

| | | |
|---|---|---|
| WO | WO9917315 | 4/1999 |
| WO | WO9917316 | 4/1999 |
| WO | WO9917422 | 4/1999 |
| WO | WO9917424 | 4/1999 |
| WO | WO9917425 | 4/1999 |
| WO | WO9917426 | 4/1999 |
| WO | WO9917427 | 4/1999 |
| WO | WO9917428 | 4/1999 |
| WO | WO9917429 | 4/1999 |
| WO | WO9917432 | 4/1999 |
| WO | WO9917433 | 4/1999 |
| WO | WO9919963 | 4/1999 |
| WO | WO9919969 | 4/1999 |
| WO | WO9919970 | 4/1999 |
| WO | WO9927546 | 6/1999 |
| WO | WO9928919 | 6/1999 |
| WO | WO9928921 | 6/1999 |
| WO | WO 99/28922 | 6/1999 |
| WO | WO9928923 | 6/1999 |
| WO | WO9928924 | 6/1999 |
| WO | WO9928925 | 6/1999 |
| WO | WO9928927 | 6/1999 |
| WO | WO9928928 | 6/1999 |
| WO | WO9928929 | 6/1999 |
| WO | WO9928930 | 6/1999 |
| WO | WO9928931 | 6/1999 |
| WO | WO9928934 | 6/1999 |
| WO | WO9928994 | 6/1999 |
| WO | WO9929005 | 6/1999 |
| WO | WO99/29005 | 6/1999 |
| WO | WO9929008 | 6/1999 |
| WO | WO9929011 | 6/1999 |
| WO | WO9929012 | 6/1999 |
| WO | WO9929013 | 6/1999 |
| WO | WO9929014 | 6/1999 |
| WO | WO9929015 | 6/1999 |
| WO | WO9929016 | 6/1999 |
| WO | WO9929017 | 6/1999 |
| WO | WO9929018 | 6/1999 |
| WO | WO9929019 | 6/1999 |
| WO | WO9929020 | 6/1999 |
| WO | WO9929021 | 6/1999 |
| WO | WO9929022 | 6/1999 |
| WO | WO 99/29023 | 6/1999 |
| WO | WO9929024 | 6/1999 |
| WO | WO 99/29025 | 6/1999 |
| WO | WO9929026 | 6/1999 |
| WO | WO9929029 | 6/1999 |
| WO | WO9929034 | 6/1999 |
| WO | WO9928926 | 9/1999 |

OTHER PUBLICATIONS

Analysis of faulted Power Systems; P Anderson, Iowa State University Press / Ames, Iowa, 1973, pp 255–257.

36–Kv. Generators Arise from Insulation Research; P. Sidler; Electrical World Oct. 15, 1932, ppp 524.

Oil Water cooled 300 MW turbine generator;L.P. Gnedin et al;Elektrotechnika , 1970, pp 6–8.

J&P Transformer Book $11^{th}$ Edition;A.C. Franklin et al; owned by Butterworth—Heinemann Ltd, Oxford Printed by Hartnolls Ltd in Great Britain 1983, pp 29–67.

Transformerboard; H.P. Moser et al; 1979, pp 1–19.

The Skagerrak transmission—the world's longest HVDC submarine cable link; L. Haglof et al of ASEA; ASEA Journal vol 53, No. 1–2, 1980, pp 3–12.

Direct Connection of Generators to HVDC Converters: Main Characteristics and Comparative Advantages; J.Arrillaga et al; Electra No. 149, Aug. 1993, pp 19–37.

Our flexible friend article; M. Judge; New Scientist, May 10, 1997, pp 44–48.

In–Service Performance of HVDC Converter transformers and oil–cooled smoothing reactors; G.L. Desilets et al; Electra No. 155, Aug. 1994, pp 7–29.

Transformateurs a courant continu haute tension–examen des specifications; A. Lindroth et al; Electra No 141, Apr. 1992, pp 34–39.

Development of a Termination for the 77 kV–Class High Tc Superconducting Power Cable; T. Shimonosono et al; IEEE Power Delivery, vol 12, No. 1, Jan. 1997, pp 33–38.

Verification of Limiter Performance in Modern Excitation Control Systems; G. K. Girgis et al; IEEE Energy Conservation, vol. 10, No. 3, Sep. 1995, pp 538–542.

A High Initial response Brushless Excitation System; T. L. Dillman et al; IEEE Power Generation Winter Meeting Proceedings, Jan. 31, 1971, pp 2089–2094.

Design, manufacturing and cold test of a superconducting coil and its cryostat for SMES applications; A. Bautista et al; IEEE Applied Superconductivity, vol 7, No. 2, Jun. 1997, pp 853–856.

Quench Protection and Stagnant Normal Zones in a Large Cryostable SMES; Y. Lvovsky et al; IEEE Applied Superconductivity, vol. 7, No. 2, Jun. 1997, pp 857–860.

Design and Construction of the 4 Tesla Background Coil for the Navy SMES Cable Test Apparatus; D.W.Scherbarth et al; IEEE Appliel Superconductivity, vol. 7, No. 2, Jun. 1997, pp 840–843.

High Speed Synchronous Motors Adjustable Speed Drives; ASEA Generation Pamphlet OG 135–101 E, Jan. 1985, pp 1–4.

Billig burk motar overtonen; A. Felldin; ERA (TEKNIK) Aug. 1994, pp 26–28.

400–kV XLPE cable system passes CIGRE test; ABB Article; ABB Review Sep. 1995, pp 38.

FREQSYN—a new drive system for high power applications;J–A. Bergman et al; ASEA Journal 59, Apr. 1986, pp 16–19.

Canadians Create Conductive Concrete; J. Beaudoin et al; Science, vol. 276, May 23, 1997, pp 1201.

Fully Water–Cooled 190 MVA Generators in the Tonstad Hydroelectric Power Station; E. Ostby et al; BBC Review Aug. 1969, pp 380–385.

Relocatable static var compensators help control unbundled power flows; R. C. Knight et al; Transmission & Distribution, Dec. 1996, pp 49–54.

Investigation and Use of Asynchronized Machines in Power Systems*; N.I.Blotskii et al; Elektrichestvo, No. 12, 1–6, 1985, pp 90–99.

Variable–speed switched reluctance motors; P.J. Lawrenson et al; IEE proc, vol. 127, Pt.B, No. 4, Jul. 1980, pp 253–265.

Das Einphasenwechselstromsystem hoherer Frequenz; J.G. Heft; Elektrische Bahnen eb; Dec. 1987, pp 388–389.

Power Transmission by Direct Current;E. Uhlmann;ISBN 3–540–07122–9 Springer–Verlag, Berlin/Heidelberg/New York; 1975, pp 327–328.

Elektriska Maskiner; F. Gustavson; Institute for Elkreaftek-nilk, KTH; Stockholm, 1996, pp 3–6—3–12.

Die Wechselstromtechnik; A. Cour' Springer Verlag, Germany; 1936, pp 586–598.

Insulation systems for superconducting transmission cables; O.Toennesen; Nordic Insulation Symposium, Bergen, 1996, pp 425–432.

MPTC: An economical alternative to universal power flow controllers;N. Mohan; EPE 1997, Trondheim, pp 3.1027–3.1030.

Lexikon der Technik; Luger; Band 2, Grundlagen der Elektrotechnik und Kerntechnik, 1960, pp 395.

Das Handbuch der Lokomotiven (hungarian locomotive V40 1 'D'); B. Hollingsworth et al; Pawlak Verlagsgesellschaft; 1933, pp. 254–255.

Synchronous machines with single or double 3–phase star–connected winding fed by 12–pulse load commutated inverter. Simulation of operational behaviour; C. Ivarson et al; ICEM 1994, International Conference on electrical machines, vol. 1, pp 267–272.

Elkrafthandboken, Elmaskiner; A. Rejminger; Elkrafthandboken, Elmaskiner 1996, 15–20.

Power Electronics—in Theory and Practice; K. Thorborg; ISBN 0–86238–341–2, 1993, pp 1–13.

Regulating transformers in power systems—new concepts and applications; E. Wirth et al; ABB Review Apr. 1997, p 12–20.

Transforming transformers; S. Mehta et al; *IEEE Spectrum*, Jul. 1997, pp. 43–49.

A study of equipment sizes and constraints for a unified power flow controller; J. Bian et al; IEEE Transactions on Power Delivery, vol. 12, No. 3, Jul. 1997, pp. 1385–1391.

Industrial High Voltage; F.H. Kreuger; *Industrial High Voltage* 1991 vol. I, pp. 113–117.

Hochspannungstechnik; A. Küchler; Hochspannungstechnik, VDI Verlag 1996, pp. 365–366, ISBN 3–18–401530–0 or 3–540–62070–2.

High Voltage Engineering; N.S. Naidu; High Voltage Engineering ,second edition 1995 ISBN 0–07–462286–2, Chapter 5, pp 91–98.

Performance Characteristics of a Wide Range Induction Type Frequency Converter; G.A. Ghoneem; leema Journal, Sep. 1995, pp 21–34.

International Electrotechnical Vocabulary, Chapter 551 Power Electronics;unknown author; International Electrotechnical Vocabulary Chapter 551: Power Electronics Bureau Central de la Commission Electrotechnique Internationale, Geneve; 1982, pp 1–65.

Design and manufacture of a large superconducting homopolar motor; A.D. Appleton; IEEE Transactions on Magnetics, vol. 19,No. 3, Part 2, May 1983, pp 1048–1050.

Application of high temperature superconductivy to electric motor design; J.S. Edmonds et al; IEEE Transactions on Energy Conversion Jun. 1992, No. 2, pp 322–329.

Power Electronics and Variable Frequency Drives; B. Bimal; IEEE Industrial Electronics—Technology and Applications, 1996, pp. 356.

Properties of High Plymer Cement Mortar; M. Tamai et al; *Science & Technology in Japan, No. 63* ; 1977, pp 6–14.

Weatherability of Polymer–Modified Mortars after Ten–Year Outdoor Exposure in Koriyama and Sapporo; Y. Ohama et al; *Science & Technology in Japan No. 63*; 1977, pp 26–31.

SMC Powders Open New Magnetic Applications; M. Persson (Editor); *SMC Update*,vol. 1, No. 1, Apr. 1997.

Characteristics of a laser triggered spark gap using air, Ar, CH4,H2, He, N2, SF6 and Xe; W.D. Kimura et al; Journal of Applied Physics, vol. 63, No. 6, Mar. 15, 1988, p. 1882–1888.

Low–intensy laser–triggering of rail–gaps with magnesium–aerosol switching–gases; W. Frey; 1 1th International Pulse Power Conference, 1997, Baltimore, USA Digest of Technical Papers, p. 322–327.

Shipboard Electrical Insulation; G. L. Moses, 1951, pp 2&3.

ABB Elkrafthandbok; ABB AB; 1988 ; pp 274–276.

Elkraft teknisk Handbok, 2 Elmaskiner; A. Alfredsson et al; 1988, pp 121–123.

High Voltage Cables in a New Class of Generators Powerformer; M. Leijon et al.; Jun. 14, 1999; pp 1–8.

Ohne Tranformator direkt ins Netz; Owman et al, ABB, AB; Feb. 8, 1999; pp 48–51.

Submersible Motors and Wet–Rotor Motors for Centrifugal Pumps Submerged in the Fluid Handled; K.. Bienick, KSB; Feb. 25, 1988; pp 9–17.

High Voltage Generators; G. Beschastnov et al; 1977; vol. 48. No. 6 pp 1–7.

Eine neue Type von Unterwassermotoren; Electrotechnik und Maschinenbam, 49; Aug. 1931; pp 2–3.

Problems in design of the 110–5OokV high–voltage generators; Nikiti et al; World Electrotechnical Congress; 6/21–27/77; Section 1. Paper #18.

Manufacture and Testing of Roebel bars; P. Marti et al; 1960, Pub. 86, vol. 8, pp 25–31.

Hydroalternators of 110 to 220 kV Elektrotechn. Obz., vol. 64, No. 3, pp 132–136 Mar. 1975; A. Abramov.

Design Concepts for an Amorphous Metal Distribution Transformer, E. Boyd et al; IEEE 11/84.

Neue Wege zum Bau zweipoliger Turbogeneratoren bis 2 GVA, 6OkV Elektrotechnik und Maschinenbau Wien Janner 1972, Heft 1, Seite 1–11; G. Aichholzer.

Optimizing designs of water–resistant magnet wire; V. Kuzenev et al; Elektrotekhnika, vol. 59, No 12, pp 35–40, 1988.

Zur Entwicklung der Tauchpumpenmotoren; A. Schanz; KSB, pp 19–24.

Direct Generation of alternating current at high voltages; R. Parsons; IEEE Journal, vol 67 #393, Jan. 15, 1929; pp 1065–1080.

Stopfbachslose Umwalzpumpen– ein wichtiges Element im modernen Kraftwerkbau; H. Holz, KSB 1, pp 13–19, 1960.

Zur Geschichte der Brown Boveri–Synchron–Maschinen; Vierzig Jahre Generatorbau; Jan.–Feb. 1931 pp 15–39.

Technik und Anwendung moderner Tauchpumpen; A. Heumann; 1987.

High capacity synchronous generator having no tooth stator; V.S. Kildishev et al; No. 1, 1977 pp 11–16.

Der Asynchronmotor als Antrieb stopfbcichsloser Pumpen; E. Picmaus; Eletrotechnik und Maschinenbay No. 78, pp 153–155, 1961.

Low core loss rotating flux transformer; R. F. Krause, et al; American Institute Physics J.Appl.Phys vol 64 #10 Nov. 1988, pp 5376–5378.

An EHV bulk Power transmission line Made with Low Loss XLPE Cable;Ichihara et al; 8/92; pp 3–6.

Underground Transmission Systems Reference Book; 1992; pp 16–19; pp 36–45; pp 67–81.

Power System Stability and Control; P. Kundur, 1994; pp 23–25; p. 767.

Six phase Synchronous Machine with AC and DC Stator Connections, Part II:Harmonic Studies and a proposed Uninterruptible Power Supply Scheme; R. Schiferl et al.; Aug. 1983 pp 2694–2701.

Six phase Synchronous Machine with AC and DC Stator Connections, Part 1: Equivalent circuit representation and Steady–State Analysis; R. Schiferl et al; Aug. 1983; pp 2685–2693.

Reactive Power Compensation; T. Petersson; 1993; pp 1–23.

Permanent Magnet Machines; K. Binns; 1987; pp 9–1 through 9–26.

Hochspannungsaniagen for Wechselstrom; 97. Hochspannungsaufgaben an Generatoren und Motoren; Roth et al; 1938; pp 452–455.

Hochspannungsanlagen for Wechselstrom; 97. Hochspannungsaufgaben an Generatoren und Motoren; Roth et al; Spring 1959, pp 30–33.

Neue Lbsungswege zum Entwurf grosser Turbogeneratoren bis 2GVA, 6OkV; G. Aicholzer; Sep. 1974, pp 249–255.

Advanced Turbine–generators—an assessment; A. Appleton, et al; International Conf. Proceedings, Lg HV Elec. Sys. Paris, FR, Aug.–Sept 1976, vol. I, Section 11–02, p 1–9.

Fully slotless turbogenerators; E. Spooner; Proc., IEEE vol. 120 #12, Dec. 1973.

Toroidal winding geometry for high voltage superconducting alternators; J. Kirtley et al; MIT—Elec. Power Sys. Engrg. Lab for IEEE PES;Feb. 1974.

High–Voltage Stator Winding Development; D. Albright et al; Proj. Report EL339, Project 1716, Apr. 1984.

POWERFORMER ™: A giant step in power plant engineering; Owman et al; CIGR 1998, Paper 11:1.1.

Thin Type DC/DC Converter using a coreless wire transformer; K. Onda et al; Proc. IEEE Power Electronics Spec. Conf.; Jun. 1994, pp 330–334.

Development of extruded polymer insulated superconducting cable; Jan. 1992.

Transformer core losses; B. Richardson; Proc. IEEE May 1986, pp 365–368.

Cloth–transformer with divided windings and tension annealed amorphous wire; T. Yammamoto et al; IEEE Translation Journal on Magnetics in Japan vol. 4, No. 9 Sep. 1989.

A study of equipment sizes and constraints for a unified power flow controller; J Bian et al; IEEE 1996.

P. Martl and R. Schuler, "Manufacturing and Testing of Roebei Bars".

M. Ichihara and F. Fukasawa, "An EHV Bulk Power Transmission Line Made with Low Losa XLPE Cable," Aug. 1992, *Hitachi Cable Review*, No. 11, pp. 3–6.

*Underground Transmission Systems Reference Book*, 1992 Edition, prepared by Power Technologies, Inc. for Electric Power Research Institute (title page).

P. Kundur, "Power System Stability and Control," *Electric Power Research Institute Power System Engineering Series*, McGraw–Hill, Inc.

R. F. Schiferl and C. M. Ong, "Six Phase Synchronous Machine with AC and DC Stator Connections, Part II: Harmonic Studies and a Proposed Uninterruptible Power Supply Scheme", *IEEE Transactions on Power Apparatus and Systems*, vol. PAS–102, No. 8, Aug. 1983, pp. 2694–2701.

R. F. Schiferl and C. M. Ong, "Six Phase Synchronous Machine with AC and DC Stator Connections, par I; Equivalent Circuit Representation and Steady–Analysis, *IEEE Transactions on Power Apparatus and Systems*," vol. PAS–102, No. 8, Aug. 1983, pp. 2685–2693.

T. Petersson, *Reactive Power Compensation*, Abb Power Systems AB, Dec. 1993.

"Different types of Permanent Magnet Rotors", a summary by ABB Corporate Research, Nov. 1997.

K. Binns, Permanent Magnet Machines, *Handbook of Electric Machines*, Chapter 9, McGraw Hill, 1987, pp. 9–1—9–25.

* cited by examiner

HYDRO-GENERATOR PLANT

TECHNICAL FIELD

The present invention relates to a hydro-generator plant of the type described in the preamble to the claim and which is intended for connection to distribution or transmission networks, hereinafter called power networks. The invention also relates to an electric generator for high voltage in a hydro-generator plant intended for the above-mentioned purpose. The invention further relates to a procedure for assembling such a plant and the manufacture of such a generator.

BACKGROUND ART

The magnetic circuits in electric generators usually comprise a laminated core, e.g. of sheet steel with a welded construction. To provide ventilation and cooling the core is often divided into stacks with radial and/or axial ventilation ducts. For larger machines the laminations are punched out in segments which are attached to the frame of the machine, the laminated core being held together by pressure fingers and pressure rings. The winding of the magnetic circuit is disposed in slots in the core, the slots generally having a cross section in the shape of a rectangle or trapezium.

In multi-phase electric generators the windings are made as either single or double layer windings. With single layer windings there is only one coil side per slot, whereas with double layer windings there are two coil sides per slot. By coil side is meant one or more conductors combined vertically or horizontally and provided with a common coil insulation, i.e. an insulation designed to withstand the rated voltage of the generator to earth.

Double-layer windings are generally made as diamond windings whereas single layer windings in the present context can be made as diamond or flat windings. Only one (possibly two) coil width exists in diamond windings whereas flat windings are made as concentric windings, i.e. with widely varying coil width. By coil width is meant the distance in arc dimension between two coil sides pertaining to the same coil.

Normally all large machines are made with double-layer winding and coils of the same size. Each coil is placed with one side in one layer and the other side in the other layer. This means that all coils cross each other in the coil end. If there are more than two layers these crossings complicate the winding work and the coil end is less satisfactory.

It is considered that coils for rotating generators can be manufactured with good results within a voltage range of 3–20 kV.

It is also generally known that connection of a synchronous machine to a power network must be via a Δ/Y-connected or step-up transformer, since the voltage of the power network is generally higher than the voltage it has hitherto been able to achieve with the electric machine. Thus this transformer and the synchronous machine constitute integrated parts of a plant. The transformer entails an extra cost and also has the drawback that the total efficiency of the system is reduced. If, therefore, it were possible to manufacture electric generators for considerably higher voltages, the step-up transformer could be eliminated.

Although the dominant known technology for supplying current from a generator to a high-voltage network, a concept which in the present application applies to the level of 20 kV and upwards, preferably higher than 36 kV, is for a transformer to be inserted between the generator and the power network, it is already known to attempt to eliminate the transformer and generate the high voltage directly out to the power network at its voltage level. Such generators are described, for instance, in U.S. Pat. Nos. 4,429,244, 4,164, 672 and 3,743,867.

However, the machine designs according to the above publications do not permit optimal utilization of the electromagnetic material in the stator.

DESCRIPTION OF THE INVENTION

The object of the invention is thus to provide an electric generator which can be used in a hydro-generator plant for such high voltage that the above-mentioned Δ/Y-connected step-up transformer can be omitted, i.e. a plant in which the electric generators are intended for considerably high voltages than conventional machines of corresponding type, in order to be able to execute direct connection to power networks at all types of high voltage.

This object has been achieved according to the invention in that a plant of the type described in the preamble to claim 1 is given the special features defined in the characterizing part of this claim, in that a generator of the type described in the preamble to claim 34 is given the special features defined in the characterizing part of this claim, and in that a procedure of the type described in the preamble to claim 33 includes the special measures defined in the characterizing parts of respective claims.

Thanks to the solid insulation in combination with the other features defined, the network can be supplied without the use of an intermediate step-up transformer even at network voltages considerably in excess of 36 kV.

The fact that the solid insulation enables the windings to be arranged for direct connection to the high-voltage network, thus eliminating the step-up transformer, offers great advantages over known technology.

The elimination of the transformer per se entails great savings, for instance, and the absence of the transformer also results in several other simplifications and thus savings.

A plant of this type is often arranged in a rock chamber where, with conventional technology, the transformer is arranged either in direct connection with the generator in the rock chamber or above ground at a distance of several hundred meters and connected to the generator by a busbar system. Compared with the first alternative, elimination of the transformer enables the volume of the rock chamber to be greatly reduced. The fire risk entailed with an oil-insulated transformer is also eliminated therefore reducing the necessity for extensive fire-safety precautions such as special evacuation routes for personnel.

In the alternative in which the transformer is placed above ground the busbar system is more extended due to the longer distance between the generator and the transformer. Since the current in the busbars (normally with aluminium conductors) is considerable, in the order of 10–20 kA, the power losses are large. Moreover, busbar systems introduce a risk for 2- and 3-phase faults during which the currents are considerable.

With the present invention two major objectives are achieved:

The losses in the busrun are reduced due to the high voltage.

The risk for 2- and 3-phase failures is considerably reduced due to the use of insulated HV cables.

The reduction in the number of electrical components achieved with the invention therefore means that the corresponding safety equipment can be omitted.

Furthermore, the rock chamber need not be blasted to allow laying of the busbar system, which entails a saving in rock chamber space of several thousand cubic meters.

The plant according to the invention also enables several connections with different voltage levels to be arranged, i.e. the invention can be used for all auxiliary power in the power station.

In all, the advantages mentioned above entail radically improved total economy for the plant. The plant cost, typically in the order of some hundred million SEK, is reduced by 30–50%. Operating economy is improved both by less need for maintenance and by an increase in the degree of efficiency by 1–1.5%. For an operating time of 8000 h/year, an output level corresponding to 150 MVA, a kWh price of SEK 0.20 and a useful service life of 30 years the gain would be approximately SEK 75–100 million per generator.

In a particularly preferred embodiment of the plant and generator respectively, the solid insulation system comprises at least two layers, each layer constituting essentially an equipotential surface, and also intermediate solid insulation therebetween, at least one of the layers having substantially the same coefficient of thermal expansion as the solid insulation.

This embodiment constitutes an expedient embodiment of the solid insulation that in an optimal manner enables the windings to be directly connected to the high-voltage network and where harmonization of the coefficients of thermal expansion eliminates the risk of defects, cracks or the like upon thermal movement in the winding.

It should be evident that the windings and the insulating layers are flexible so that they can be bent.

It should also be pointed out that the plant according to the invention can be constructed using either horizontal or vertical generators, which may be of either underground or aboveground type.

The above and other preferred embodiments of the invention are defined in the dependent claims.

The major and essential difference between known technology and the embodiment according to the invention is thus that this is achieved with a magnetic circuit included in an electric generator which is arranged to be directly connected via only breakers and isolators to a high supply voltage in the vicinity of between 20 and 800 kV, preferably higher than 36 kV. The magnetic circuit thus comprises a laminated core having at least one winding consisting of a threaded cable with one or more permanently insulated conductors having a semiconducting layer both at the conductor and outside the insulation, the outer semiconducting layer being connected to earth potential.

To solve the problems arising with direct connection of electric machines to all types of high-voltage power networks, the generator in the plant according to the invention has a number of features as mentioned above, which differ distinctly from known technology. Additional features and further embodiments are defined in the dependent claims and are discussed in the following.

Such features mentioned above and other essential characteristics of the generator and thus of the hydro-generator plant according to the invention include the following:

The winding of the magnetic circuit is produced from a cable having one or more permanently insulated conductors with a semiconducting layer at both conductor and sheath. Some typical conductors of this type are PEX cable or a cable with EP rubber insulation which, however, for the present purpose are further developed both as regards the strands in the conductor and the nature of the outer sheath.

Cables with circular cross section are preferred, but cables with some other cross section may be used in order to obtain better packing density, for instance.

Such a cable allows the laminated core to be designed according to the invention in a new and optimal way as regards slots and teeth.

The winding is preferably manufactured with insulation in steps for best utilization of the laminated core.

The winding is preferably manufactured as a multi-layered, concentric cable winding, thus enabling the number of coil-end intersections to be reduced.

The slot design is suited to the cross section of the winding cable so that the slots are in the form of a number of cylindrical openings running axially and/or radially outside each other and having an open waist running between the layers of the stator winding.

The design of the slots is adjusted to the relevant cable cross section and to the stepped insulation of the winding. The stepped insulation allows the magnetic core to have substantially constant tooth width, irrespective of the radial extension.

The above-mentioned further development as regards the strands entails the winding conductors consisting of a number of impacted strata/layers, i.e. insulated strands that from the point of view of an electric machine, are not necessarily correctly transposed, uninsulated and/or insulated from each other.

The above-mentioned further development as regards the outer sheath entails that at suitable points along the length of the conductor, the outer sheath is cut off, each cut partial length being connected directly to earth potential.

The use of a cable of the type described above allows the entire length of the outer sheath of the winding, as well as other parts of the plant, to be kept at earth potential. An important advantage is that the electric field is close to zero within the coil-end region outside the outer semiconducting layer. With earth potential on the outer sheath the electric field need not be controlled. This means that no field concentrations will occur either in the core, in the coil-end regions or in the transition between them.

The mixture of insulated and/or uninsulated impacted strands, or transposed strands, results in low stray losses.

The cable for high voltage used in the magnetic circuit winding is constructed of an inner core/conductor with a plurality of strands, at least two semiconducting layers, the innermost being surrounded by an insulating layer, which is in turn surrounded by an outer semiconducting layer having an outer diameter in the order of 20–200 mm and a conductor area in the order of 40–3000 mm$^2$.

The solid insulation in a generator according to the invention also offers great advantages when constructing a hydro-generator plant. The absence of wet insulation means that the stator of the generator need not be completed at the factory but can instead be delivered in parts and assembled on site. A stator of the size under consideration here is large and heavy which has entailed transport problems with conventional designs where the roads must be reinforced and dimensioned for the vast weight. This problem is eliminated since the stator for a generator can be delivered in parts.

The invention thus also relates to the procedures as defined in claims 30 and 33, where this possibility is exploited when building a hydro-generator plant and manufacturing a generator, respectively.

BRIEF DESCRIPTION OF THE DRAWINGS

The invention will be described in more detail in the following detailed description of a preferred embodiment of constructing the magnetic circuit of the electric generator in the hydro-generator plant, with reference to the accompanying drawings in which.

DESCRIPTION OF A PREFERRED EMBODIMENT

Figure 5:
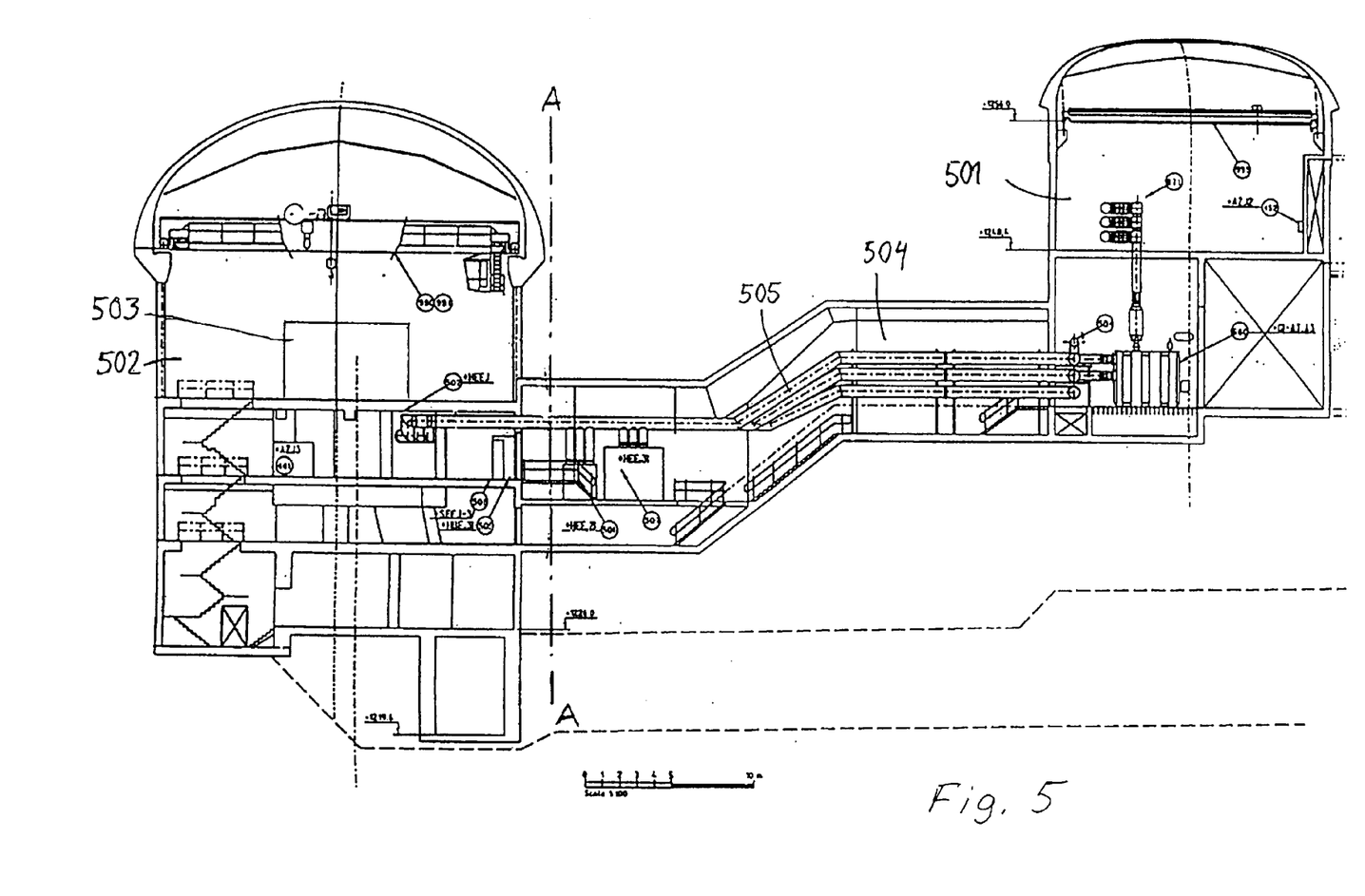
FIG. 5 shows a section through a conventional hydro-generator plant.
Figure 6:
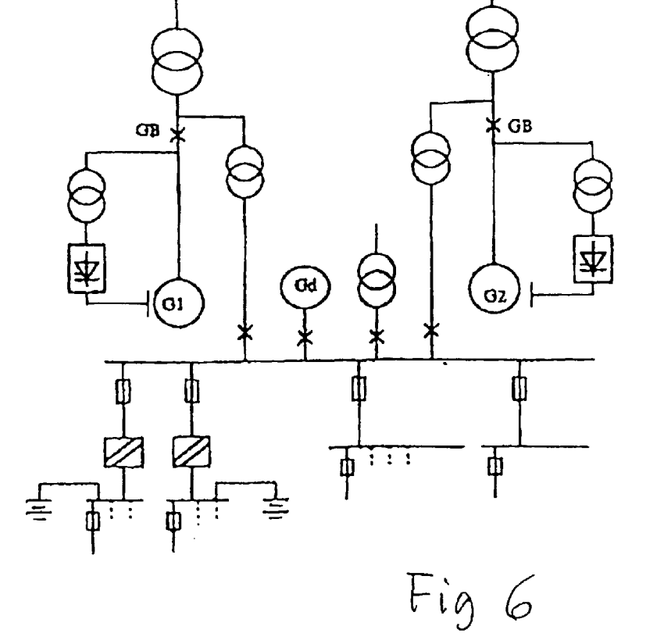
FIG. 6 is a diagram showing a traditional solution for auxiliary power for a hydro plant.
Figure 7:
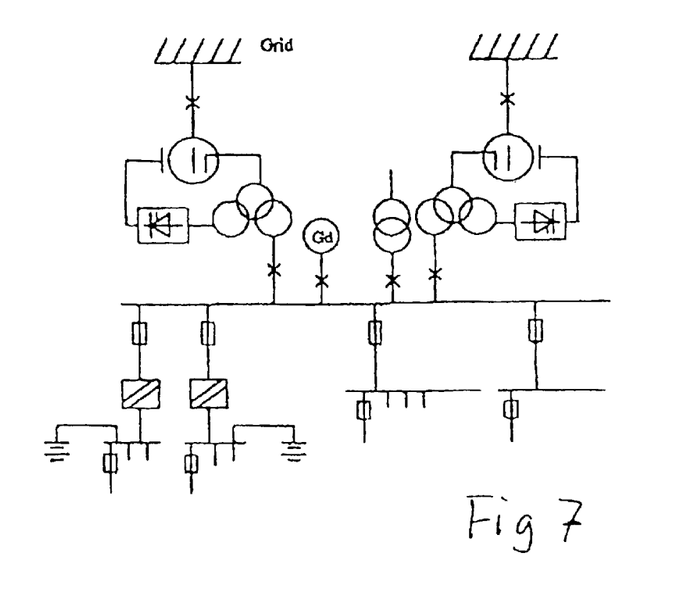
FIG. 7 is a diagram showing generators with build-in windings for generation of auxiliary power according to the invention.

In order to understand certain aspects of the advantages of the invention, reference is made initially to FIG. 5 showing an example of a conventional hydro-generator plant. This is of a type with the transformer hall 501 situated some way from the generator hall 502, the latter being in the form of a rock chamber housing the generator 503. The generator 503 is connected to the transformer in the transformer hall 501 via a busbar system 505 arranged in a tunnel system 504 several hundred meters long. A plant according to the invention entirely eliminates the part to the right of the line A-A in FIG. 5, while substantially the same dimensions are retained in the generator hall 502. A conventional plant without the transformer situated above ground as shown in FIG. 5 would instead require a considerably larger generator hall 502 to allow space for the transformer and its auxiliary and safety equipment.

Figure 1:
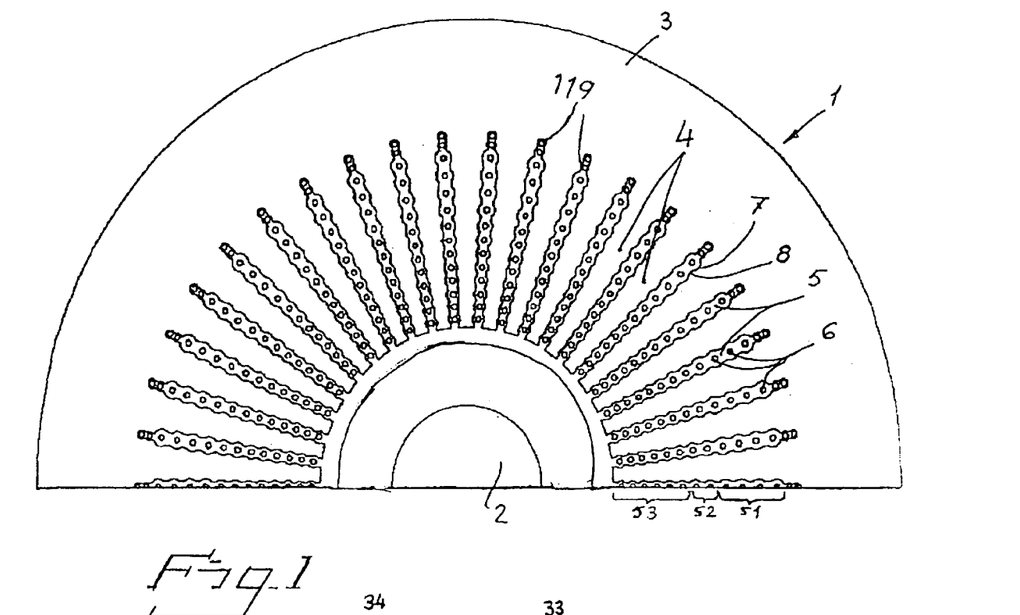
FIG. 1 shows a schematic axial end view of a sector of the stator in an electric generator in the hydro-generator plant according to the invention.

The rotor 2 of the generator is also indicated in the schematic axial view through a sector of the stator 1 according to FIG. 1, pertaining to the generator 100 (FIG. 3) included in the hydro-generator plant. The stator 1 is composed in conventional manner of a laminated core. FIG. 1 shows a sector of the generator corresponding to one pole pitch. From a yoke part 3 of the core situated radially outermost, a number of teeth 4 extend radially in towards the rotor 2 and are separated by slots 5 in which the stator winding is arranged. Cables 6 forming this stator winding, are high-voltage cables which may be of substantially the same type as those used for power distribution, i.e. PEX cables. PEX=crosslinked polyethylene (XLPE). One difference is that the outer, mechanically-protective sheath, and the metal screen normally surrounding such power distribution cables are eliminated so that the cable for the present application comprises only the conductor and at least one semiconducting layer on each side of an insulating layer. Thus, the semiconducting layer which is sensitive to mechanical damage lies naked on the surface of the cable.

The cables 6 are illustrated schematically in FIG. 1, only the conducting central part of each cable part or coil side being drawn in. As can be seen, each slot 5 has varying cross section with alternating wide parts 7 and narrow parts 8. The wide parts 7 are substantially circular and surround the cabling, the waist parts between these forming narrow parts 8. The waist parts serve to radially fix the position of each cable. The cross section of the slot 5 also narrows radially inwards. This is because the voltage on the cable parts is lower the closer to the radially inner part of the stator 1 they are situated. Slimmer cabling can therefore be used there, whereas coarser cabling is necessary further out. In the example illustrated cables of three different dimensions are used, arranged in three correspondingly dimensioned sections 51, 52, 53 of slots 5. An auxiliary power winding 9 is arranged furthest out in the slot 5.

Figure 2:
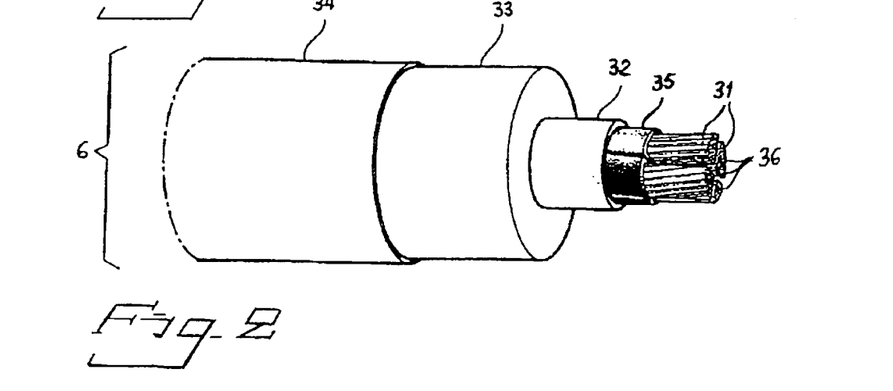
FIG. 2 shows an end view, partially stripped, of a cable used in the winding of the stator according to FIG. 1.

FIG. 2 shows a step-wise stripped end view of a high-voltage cable for use in an electric machine according to the present invention. The high-voltage cable 6 comprises one or more conductors 31, each of which comprises a number of strands 36 which together give a circular cross section of copper (Cu), for instance. These conductors 31 are arranged in the middle of the high-voltage cable 6 and in the shown embodiment each is surrounded by a part insulation 35. However, it is feasible for the part insulation 35 to be omitted on one of the conductors 31. In the present embodiment of the invention the conductors 31 are together surrounded by a first semiconducting layer 32. Around this first semiconducting layer 32 is an insulating layer 33, e.g. PEX insulation, which is in turn surrounded by a second semiconducting layer 34. Thus the concept "high-voltage cable" in this application need not include any metallic screen or outer sheath of the type that normal surrounds such a cable for power distribution.

A hydro-generator with a magnetic circuit of the type described above is shown in FIG. 3 where the generator 100 is driven by a water turbine 102 via a common shaft 101.

Figure 3:
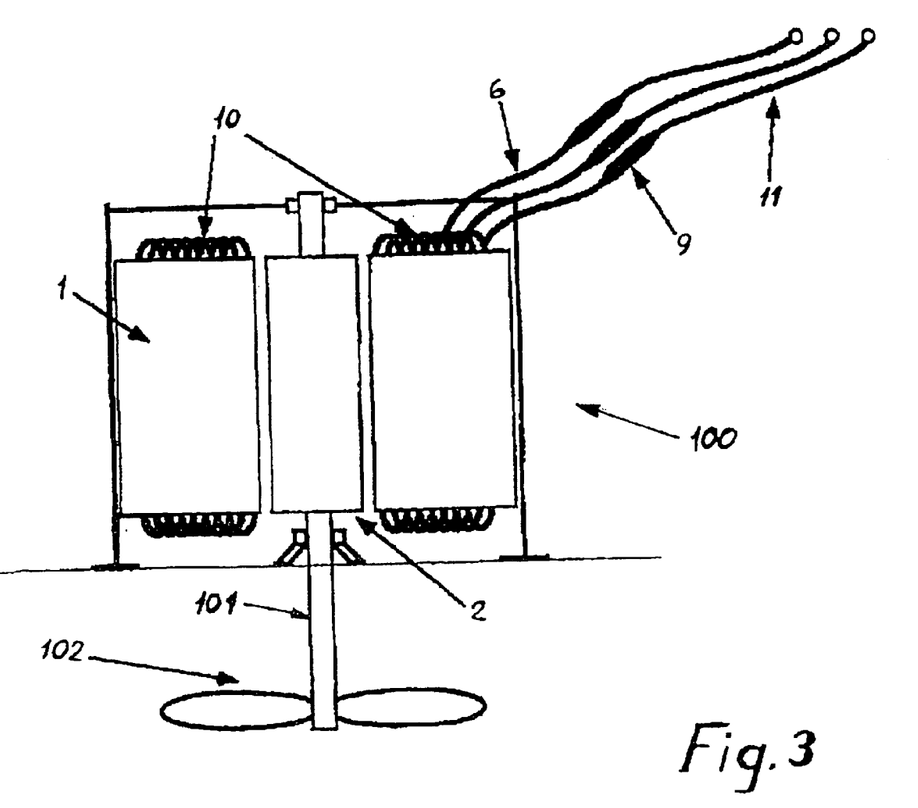
FIG. 3 shows a simplified view, partially in section, of a hydro-generator arrangement according to the invention.

The stator 1 of the generator 100 thus carries the stator windings 10 which are built up of the cable 6 described above. The cable 6 is unscreened and changes to a screened cable 11 at the cable splicing 9.

With a hydro-generator 100 according to the invention it is thus possible to generate extremely high electric voltages of up to approximately 800 kV. It is thus possible to electrically connect the hydro-generator 100 directly to a distribution or transmission network 110 with an intermediate step-up transformer or similar electric machine as is generally the case in conventional plants where equivalent generators are able at most to generate voltages of up of 25–30 kV.

Figure 4:
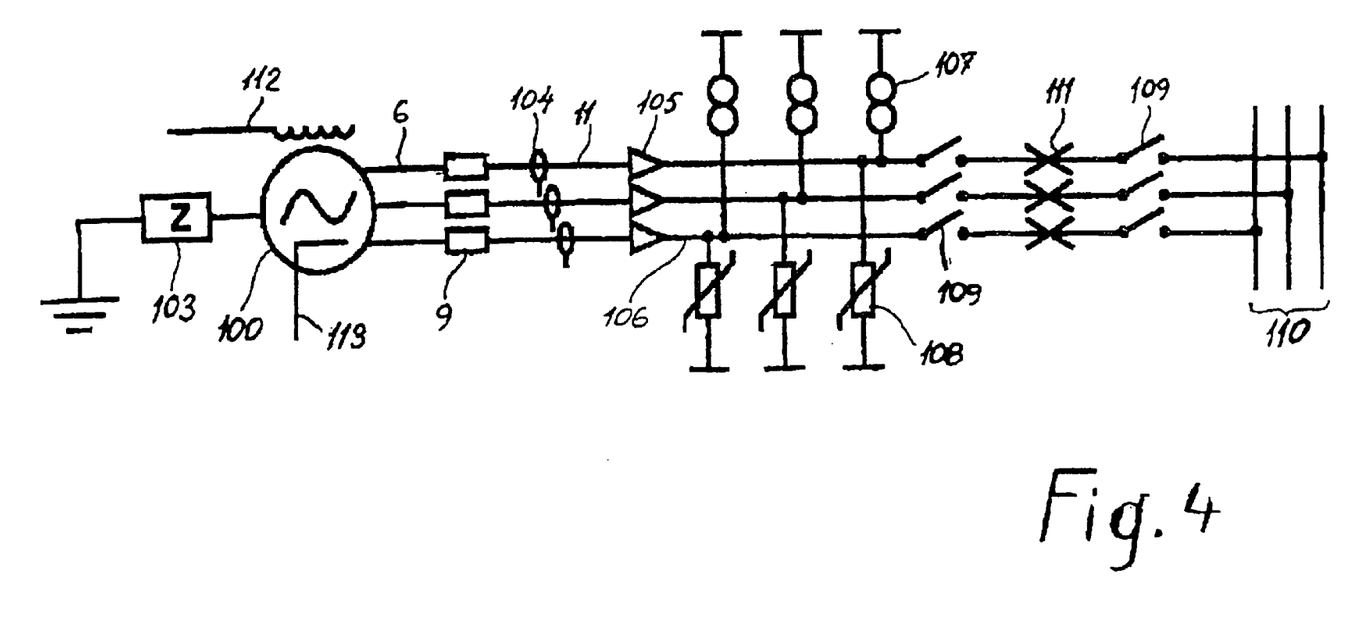
FIG. 4 shows a circuit diagram for the hydro-generator plant according to the invention.

FIG. 4 illustrates a hydro-generator plant according to the present invention. In conventional manner, the generator 100 has an excitation winding 112 and one (or more) auxiliary power winding(s) 113. In the shown embodiment of the plant according to the invention the generator 100 is earthed via an impedance 103.

It can also be seen from FIG. 4 that the generator 100 is electrically connected via the cable splicing 9 to the screened cable 11 (see also FIG. 3). The cable 11 is provided with current transformers 104 in conventional manner, and terminates at 105. After this point 105 the electric plant in the shown embodiment continues with busbars 106 having branches with voltage transformers 107 and surge arresters 108. However, the main electric supply takes place via the busbars 106 directly to the distribution or transmission network 110 via isolator 109 and circuit-breaker 111.

A hydro-generator plant according to the invention is designed for operation either to generate electric voltage for the power network as described above, or as a pump plant, i.e. to be driven from the electric power network 110. The generator 100 then operates as a motor to drive the turbine 102 as a pump.

Thus, with the hydro-generator 100, no intermediate coupling of a step-up transformer is required. With the hydro-generator plant according to the present invention, therefore, several transformer and breaker units previously necessary are eliminated, which is obviously an advantage—not least from the aspects of cost and operating reliability.

Although the hydro-generator and the plant in which this generator is included have been described and illustrated in connection with an embodiment by way of example, it should be obvious to one skilled in that art that several modifications are possible without departing from the inventive concept. The generator may be earthed directly, for instance, without any impedance. The auxiliary windings can be omitted, as also other components shown. Although the invention has been exemplified with a three-phase plant, the number of phases may be more or less.

What is claimed is:

1. A hydrogenerator plant for connection to a high voltage transmission or distribution network comprising: at least one rotating electric machine for high voltage coupled to a turbine via shaft means, said electric machine comprising at least one winding formed of a conductor including a plurality of insulated conductive elements, and at least one uninsulated conductive element; a covering surrounding the conductor including an inner layer having semiconducting properties, a solid insulating layer surrounding the inner layer and an outer layer having semiconducting properties surrounding the insulating layer, said inner layer being in contact with the uninsulated element such that the inner layer has the same potential as the conductor, and said at least one winding being directly connectable to the transmission or distribution network, the voltages being across a range of transmission or distribution voltages.

2. The plant as claimed in claim 1 wherein the at least two semiconducting layers each form essentially an equipotential surface, and wherein at least one of the layers has substantially the same coefficient of thermal expansion as the solid insulation.

3. The plant as claimed in claim 1, wherein the generator comprises a magnetic circuit with a magnetic core.

4. The plant as claimed in claim 3, wherein the electric machine includes a core comprising laminated sheet of at least one of cast iron, powder-based iron, and rough forge iron.

5. The plant as claimed in claim 1 wherein the winding comprises a cable.

6. The plant as claimed in claim 5, wherein at least two of said layers have substantially the same coefficient of thermal expansion.

7. The plant as claimed in claim 1, wherein the inner semiconducting layer is at substantially the same potential as the conductors.

8. The plant as claimed in claim 1, wherein the outer semiconducting layer forms an equipotential surface surrounding the conductors.

9. The plant as claimed in claim 8, wherein said outer semiconducting layer is connected to a predefined potential.

10. The plant as claimed in claim 9, wherein the predefined potential is earth potential.

11. A plant as claimed in claim 9 wherein the coils in the stator are distributed and have a coil span different from the pole pitch.

12. The plant as claimed in claim 1, wherein the cable also comprises a metal screen and a sheath.

13. The plant as claimed in claim 1 including a stator cooled at earth potential by means of a fluid.

14. The plant as claimed in claim 1 wherein the outer semiconducting layer is connected to earth potential.

15. The plant as claimed in claim 1, wherein the electric machine includes a rotor inductively connected to the high voltage.

16. The plant as claimed in claim 15, wherein the rotor is cylindrical in shape, has salient poles and also has a constant air gap.

17. The plant as claimed in claim 16, wherein the electric machine includes a stator having a stator winding formed as at least one of an integral slot winding, and a fractional slot winding.

18. The plant as claimed in claim 17, wherein the stator has a pole pitch and the winding is distributed and includes a coil having a coil span different from the pole pitch.

19. The plant as claimed in claim 1, wherein the cable has a conductor area of about between 40 and 3000 mm$^2$ and an outer cable diameter of about between 20 and 250 mm.

20. The plant as claimed in claim 19, wherein the cable is cooled by gas or liquid inside current-carrying conductors.

21. The plant as claimed in claim 1, wherein the electric machine is designed for high voltage and arranged to supply the out-going electric network directly without any intermediate connection of a transformer.

22. The plant as claimed in claim 21, wherein at least one electric machine is earthed via an impedance.

23. The plant as claimed in claim 21, wherein electric machine is directly earthed.

24. The plant as claimed in claim 21, wherein said plant is operative as at least one of a pump and turbine station, the electric machine being arranged to function as at least one of a motor driven directly from the transmission or distribution network and as a generator, generating voltage for the transmission or distribution network.

25. The plant as claimed claim 21, wherein the electric machine is arranged to generate power to various voltage levels.

26. The plant as claimed in claim 25, wherein at least one electric machine includes a separate auxiliary winding for producing auxiliary power at one of said voltage levels.

27. The plant as claimed in claim 1, comprising a plurality of electric machines, each of which lacks an individual step-up transformer, but which, via a system transformer common to the electric machines, is connected to the transmission or distribution network.

28. The plant as claimed in claim 1, including a common earth system.

29. The plant as claimed in claim 1, wherein the winding of the electric machine is operable for self-regulating field control and lacks auxiliary means for control of the field.

30. The plant as claimed in claim 1, wherein the electric machine includes a stator comprising a plurality of stator limitations having openings for receiving the winding, said laminations being assembled into a stack with the openings aligned, and the winding comprises a cable threaded into the openings or the stacking laminations of the stator at the manufacturing facility or at the generation plant site.

31. An electric generator for a high voltage included in a hydro-generator plant in which the generator is coupled to a turbine via shaft means, said generator comprising at least one winding including a conductor, a solid insulation covering including an inner layer having semiconducting properties; a solid insulating layer surrounding the inner layer and an outer layer having semiconducting properties surrounding the insulation layer; said conductor formed of a plurality of conductive elements including at least one uninsulated element in contact with the inner layer and a plurality of insulated elements; and wherein each winding is directly connectable to a high voltage transmission or distribution network, and the inner layer forms an equipotential surface about the conductor.

32. A hydrogenerator plant including a rotating high voltage electric machine comprising a stator; a rotor and a winding, wherein said winding comprises a cable including a current-carrying conductor and a magnetically permeable, electric field confining cover surrounding the conductor, the cover including an inner layer having semiconducting properties, a solid insulation surrounding the inner layer and an outer layer having semiconducting properties surrounding the solid insulation, said cable forming at least one uninterrupted turn in the corresponding winding of said machine, and wherein the conductor includes a plurality of insulated conductive strands and at least one uninsulated electrically conductive strand in contact with the inner layer, such that said conductor and inner layer are at the same potential.

33. The hydrogenerator plant of claim 32, wherein the outer layer has a conductivity sufficient to establish an equipotential surface around the conductor.

34. The hydrogenerator plant of claim 32, wherein the cover is formed of a plurality of integrally bonded layers, and wherein said plurality of layers are substantially void free.

35. A hydrogenerator plant for direct connection to a high voltage transmission or distribution network comprising: at least one rotating electric machine for high voltage coupled to a turbine via shaft means, said electric machine including at least one winding comprising a conductor and a magnetically permeable, electric field confining insulating covering surrounding the conductor including an inner layer having semiconducting properties, a solid insulation surrounding the inner layer and an outer layer having semiconducting properties surrounding the insulating layer, said conductor including at least one of a plurality of insulated conductive elements, and at least one uninsulated conductive element being in contact with the inner layer such that said conductor and inner layer are at the same potential; and said at least one winding being directly connectable to the transmission or distribution network.

* * * * *